(12) United States Patent
Casey

(10) Patent No.: US 9,642,387 B1
(45) Date of Patent: May 9, 2017

(54) STOVETOP POPCORN POPPER

(71) Applicant: Gary Lee Casey, Holland, MI (US)

(72) Inventor: Gary Lee Casey, Holland, MI (US)

( * ) Notice: Subject to any disclaimer, the term of this patent is extended or adjusted under 35 U.S.C. 154(b) by 0 days.

(21) Appl. No.: 14/629,008

(22) Filed: Feb. 23, 2015

(51) Int. Cl.
*A23L 7/00* (2016.01)
*A23L 7/187* (2016.01)
*A47J 36/16* (2006.01)

(52) U.S. Cl.
CPC ............ *A23L 7/187* (2016.08); *A47J 36/165* (2013.01); *A23V 2002/00* (2013.01)

(58) Field of Classification Search
CPC .................................................. A23N 12/125
USPC ........ 99/323.5, 348; 366/252, 366, 331, 247
See application file for complete search history.

(56) References Cited

U.S. PATENT DOCUMENTS

| | | | | | |
|---|---|---|---|---|---|
| 1,475,081 | A * | 11/1923 | Parks | ....................... | A23L 7/187 366/248 |
| 1,617,643 | A * | 2/1927 | Kriete | ..................... | A23L 7/187 366/247 |
| 2,561,203 | A * | 7/1951 | Joffe | ........................ | B01F 7/16 366/248 |
| 4,149,455 | A * | 4/1979 | Ross | ....................... | A23L 7/187 366/247 |
| 4,202,256 | A * | 5/1980 | Brooks | ................. | A47J 36/165 366/248 |
| 4,763,567 | A * | 8/1988 | Dalquist, III | ......... | A47J 36/165 366/247 |
| 5,163,357 | A * | 11/1992 | Felknor | .................... | A23L 7/187 366/252 |
| 5,787,798 | A * | 8/1998 | Stein | ....................... | A23L 7/187 366/144 |
| 5,938,325 | A * | 8/1999 | Edwards | ............. | B01F 7/00066 366/129 |
| 6,026,735 | A * | 2/2000 | Waterworth | .......... | A47J 27/002 366/146 |
| 6,224,235 | B1 * | 5/2001 | Parker | ....................... | F21L 4/00 362/190 |
| 8,434,403 | B1 * | 5/2013 | Cloutier | .................. | A23L 7/161 366/247 |
| 2004/0194633 | A1 * | 10/2004 | Bourne | .................... | A23L 7/187 99/323.5 |

* cited by examiner

*Primary Examiner* — Nina Bhat

(57) ABSTRACT

A stovetop popcorn cooker (popper) contains a rotating shaft inclined with respect to the vertical axis of its bowl and is connected to and rotates a stirrer parallel to the bottom. The unique connection between the shaft and stirrer allows the stirrer to remain in continuous contact with the bottom while being rotated by the inclined shaft. A hinged lid extends over the majority of the top area of bowl. The bowl (pot), the cross-section of which has a flat bottom, may incorporate a first curved portion tangent to the bottom and second curved portion tangent to a cylindrical portion at the top.

11 Claims, 3 Drawing Sheets

STOVETOP POPCORN POPPER

CROSS-REFERENCE TO RELATED APPLICATIONS

Not applicable

BACKGROUND OF THE INVENTION

This invention generally relates to the field of stovetop popcorn poppers. Conventionally, these consist of a cooking bowl of sufficient volume to contain the popped corn, a lid, and a means for stirring the un-popped corn that is on the bottom of the bowl. Stirring the corn at the bottom of the bowl is necessary to prevent already-popped corn from remaining in contact with the bottom of the bowl, causing it to burn. While this function can be performed simply by shaking the bowl, the common practice is to provide a rotary stirrer to keep the corn in motion, generally by way of a central vertically-oriented shaft that rotates a stirring arm at the bottom. All currently-available popper configurations embody designs that create several operational difficulties. For example, if a simple crank handle is provided at the top of central shaft, the operator's hand is forced to remain directly above the popping corn, exposing it to the large quantity of steam produced during popping. To solve this problem, many manufacturers add a right-angle bevel gear pair at the top of the bowl, connecting to a horizontal shaft, allowing the crank handle to be located off to the side of the bowl, away from direct heat. In addition to the introduced complexity and potential failure modes this requires a "bridge" structure that crosses over the center of the bowl. Consequently, the area encompassed by the lid(s) must then be limited to the space between the bridge and one or both sides of the bowl. Because of this necessarily small area, the popped corn often jams against the bridge, preventing easy pouring of the popped corn. It is consequently difficult or impossible to pop more corn than the bowl will hold, limiting the utility of the popper.

| References cited: | | |
|---|---|---|
| 8,434,403 | May, 2013 | Cloutier, et al. |
| 6,307,193 | October, 2001 | Toole |
| 5,163,357 | August, 1988 | Felknor et al. |

BRIEF SUMMARY OF THE INVENTION

This invention solves problems experienced when using existing popcorn poppers. To eliminate any obstruction at the top of the popper, the stirrer drive shaft is angled from the axis of the bowl, which simultaneously allows several benefits to be realized. First, the typical bevel gears are eliminated because the crank handle is simply attached to the upper end of the shaft. Further, the crank handle is located toward the side of the bowl, out of the direct heat from released steam. Finally, the lack of obstructions allows the single, hinged lid to be very large, encompassing the majority of the area of the bowl top. This allows popping corn to be easily discharged from the popper while popping, enabling the quantity of corn to be substantially increased beyond the actual capacity of the bowl. The specially-configured stirrer is pivoted to the lower end of the shaft in such a way as to create a "universal joint", allowing the stirrer to remain parallel and in constant contact with the bottom even though the drive shaft is angled away from the perpendicular. This significantly increases the utility of the popper as well as the ease of use.

Further, the bowl is configured with a relatively small flat bottom and sides that flare away so that the popped corn is induced to rise away from the hot bottom, reducing the propensity of the popped corn to burn.

Accordingly, the invention comprises:

A popcorn popper stirring mechanism comprised of a shaft angled from the perpendicular to the bottom, driven either manually or by a power device at the top, incorporating a simple universal joint at the bottom to drive the stirring element. Additionally, a large lid is hinged on an axis offset from the center so that the lid comprises the majority of the bowl area. The stirrer preferably consists of a wire bent in such a way that it pierces and is pivoted to the shaft in an axis perpendicular to both the shaft axis and the stirrer principle axis. The bowl is configured to incorporate a flat bottom and sides curved in a specific manner.

DETAILED DESCRIPTION OF THE INVENTION

Figure 1:
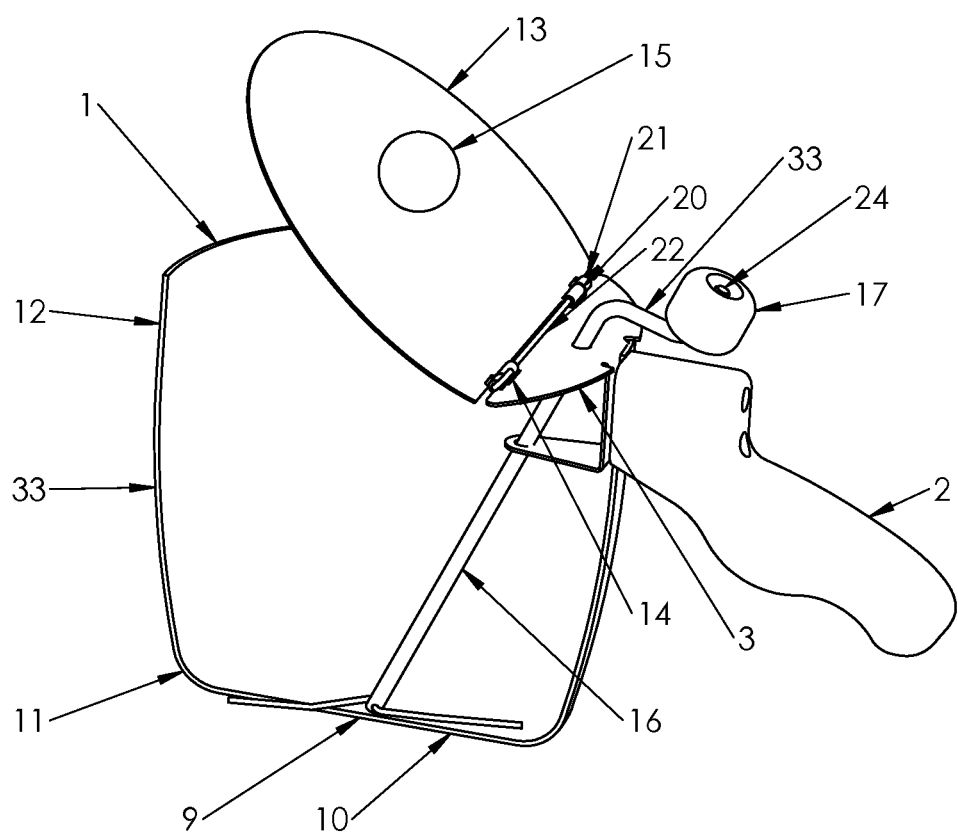
FIG. 1 is a perspective drawing of the popper showing the location of the stirrer shaft as it protrudes through the top of the bowl, which is shown in a cutaway view. Also shown is the lid in a partially-open position, illustrating the location of the hinge point. Shown is the handle, located near the height of the center of gravity.
Figure 2:
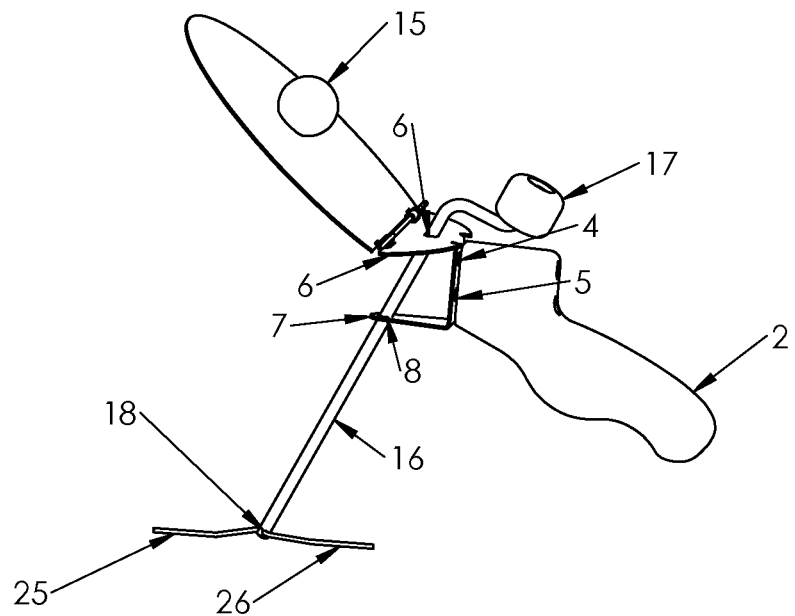
FIG. 2 is a side view of the crank mechanism with the bowl not shown for clarity. Shown is the pivot axis of the stirrer as well as the support structure for the crankshaft. The crankshaft is shown in a position such that the stirrer pivot axis is parallel to the bottom of the bowl. The configuration of the stirrer is such that the end portions are coaxial to each other and both are in sliding contact with the bowl.

Although the drawings show the invention within the context of a stovetop popcorn popper, the uses of the invention can extend to any number of similar applications that involve stirring the contents of a bowl. The cooking bowl 1 has a shape conducive to its purpose, which in the case described is the popping of corn. In a preferred embodiment the bow, shown in FIG. 1 as a section view, has a flat bottom 10, sides which consist of a rounded portion 11, a larger rounded portion 33 and a cylindrical top portion 12. However, the side of the bowl can be made from any number of other shapes, such as conical or completely cylindrical without departing from the invention. Attached to the bowl is a handle 2 that is preferably made of a material such as wood that reduces the amount of heat conducted from the bowl to the hand of the operator. A lid 13 is attached to the frame 3 by a hinge 14. Any type of hinge can be employed, but in the case illustrated the hinge is constructed by tabs on the lid 13 that have been bent into a curled shape 20, with similar tabs in the frame 3 shown at 21. A pin 22 is then passed through the curled shapes to form a hinge. The lid can be opened by the knob 15 and the lid which in the preferred embodiment is not latched in the closed position, allowing the popping corn to push the lid open as it expands if it fills the bowl during the cooking process. The frame 3 is also attached to the bowl and in this case is shown in FIG. 2 being attached by two screws 4 and 5 to the handle, passing through holes and sandwiching the bowl 1 between. Any number of alternative attachment methods can be used while still staying within the scope of the invention. The frame contains the hole 6, preferably elliptical, on the top surface. The frame also features a tab, or extension, 7 that also embodies a second and preferably elliptical hole 8. The centers of the two elliptical holes 6 and 8 line up in such a way that the extended centerline between the holes is substantially coincident with the center 9 of the bottom 10 of the bowl 1. The purpose of the holes being elliptical is to provide for a uniform clearance around the shaft 16, although round holes would cause said clearance to be only slightly non-uniform, therefore being an acceptable alternative. Passing through, guided by, and being freely rotatable within the holes 6 and 8, is located the shaft 16. Any number of alternative methods can be used to guide the shaft in an equivalent fashion as long as the axis of the shaft is substantially coincident with the center of the bottom of the bowl. The freely rotating crank knob 17 is shown attached to the offset crank arm 33 at the top of the shaft and loosely held in place by the fastener 24. Many types of readily-available and commonly used fasteners can be employed to accomplish this, including the type shown which is commonly identified as a "push-nut". Further, any other method of inducing rotation of the shaft maybe incorporated, such as a simple knob fixed to the top of the shaft or a power device such as an electric motor. At the bottom end of the crankshaft contains a transverse hole 18, perpendicular to the axis of the crankshaft, but not in any particular or required rotational alignment with the offset crank. A stirring rod 19, also shown in FIG. 2, is inserted through and free to rotate within the hole 18, and bent in such a way so the axes of its end portions 25 and 26 are both coincident to each other and perpendicular to the hole 18.

Figure 3:
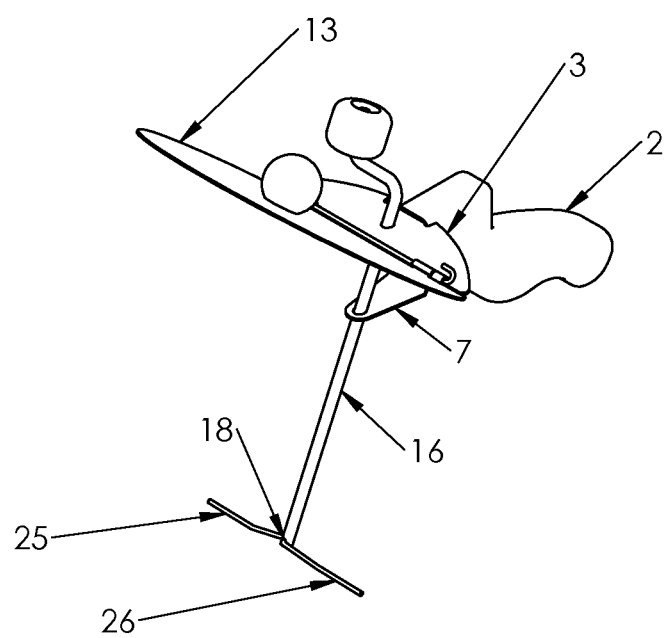
FIG. 3 is the same side view as FIG. 2 except that the crankshaft has been rotated 90 degrees, at which time the stirrer pivot axis is at its maximum deviation from the plane of the bottom of the bowl. Also shown is that the stirrer end portion axes intersect the axis of the crankshaft.

FIG. 3 shows that the stirring rod 19, being free to rotate within the hole 18, stays in contact with the bottom of the bowl as the shaft is rotated to an angle approximately 90 degrees to that shown in FIG. 2.

Figure 4:
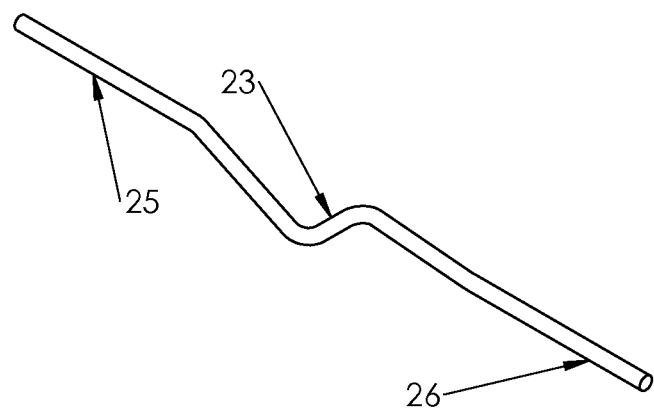
FIG. 4 shows a preferred embodiment of the stirrer, in this case a bent wire. The details of the bend configuration is shown.
Figure 5:
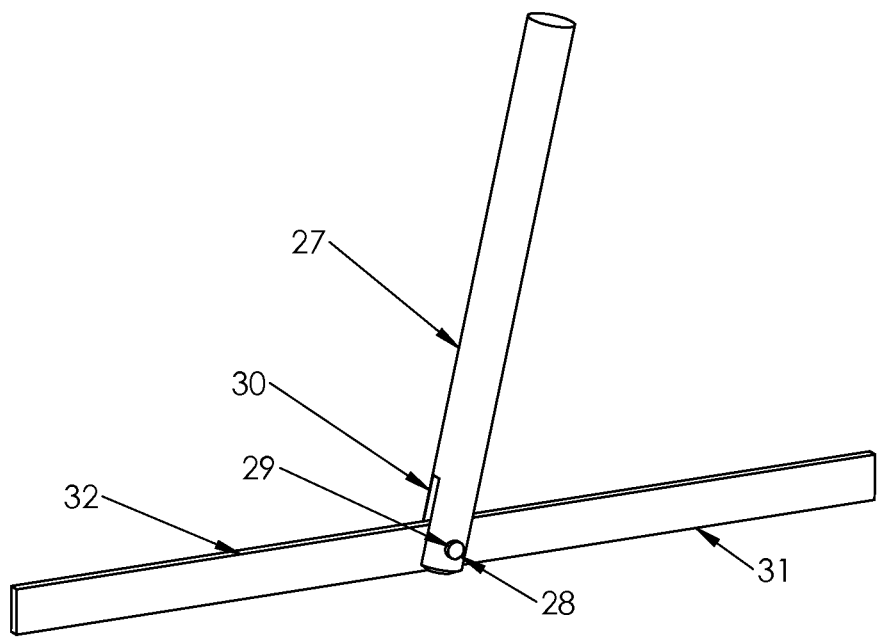
FIG. 5 shows an alternate embodiment of the stirrer, in this case a flat blade.

The stirring rod 19, shown in FIG. 4, is formed in such a way that its end portions 25 and 26 are collinear and are free to lay flat on the bottom 10 of the bowl 1. The axis of the central portion 23 of the wire is orthogonal to the axis of said end portions. The axis of said central portion is also offset from the axis of the end portions by an amount that allows the end portions to rest on the bottom of the bowl when assembled to the crankshaft 16. Further, the rod is bent in such a way that the axis of the end portions substantially intersects the axis of the crankshaft 16 when assembled. One of many acceptable alternative embodiments of the stirrer is shown in FIG. 5. In this case a flat blade 32 is the stirring device, located within a slot 30 and attached to, but free to pivot upon a pin 28 which in turn is captured by a transverse hole 29 in the shaft 27, which otherwise is of the same configuration as the shaft 16 shown elsewhere. The lower edge 31 of the blade is consequently perpendicular to the axis of the pivot pin 28 while intersecting the axis of the shaft 27. There are many other possible stirring member configurations apparent to one skilled in the art that can be employed without departing from the invention.

In a typical example of usage, the bowl is preheated and an appropriate quantity of cooking oil is optionally poured into the bowl. When the oil becomes heated a quantity of popcorn is introduced to the bowl, the lid closed and thereafter the stirrer is turned more or less continuously. As the corn kernels explode (pop) and fill the bowl, some popped corn is poured out, allowing the rest of the corn to continue popping. In this way the amount of corn popped in a single batch can be much larger than the bowl itself can contain. The method of operation can be modified greatly without departing from the invention.

While the present invention is illustrated by the description of a preferred embodiment and while the illustrative embodiment is described in detail, it is not the intention of the applicant to restrict or in any way limit the scope of the appended claims to such detail. Additional advantages and modifications within the scope of the appended claims will readily appear to those skilled in the art.

The invention in its broader aspects is therefore not limited to the specific details, representative apparatus and methods, and an illustrative example is shown and described. Accordingly, departures may be made from such details without departing from the spirit or scope of the applicant's general concept.

The invention claimed is:

1. A cooking appliance with a centrally-located rotating stirring member at the essentially circular bottom of a bowl, the rotating stirring member in operative connection with a rotating shaft for inducing rotation of said stirring member; wherein said rotating shaft being angled relative to the bottom axis of the cooking appliance; said stirring member being pivotably attached to the shaft on an axis orthogonal to both the shalt axis and the principal axis of the stirring member.

2. The appliance as defined in claim 1 wherein the shaft is angled between 15 and 30 degrees from the vertical axis of the bowl.

3. The appliance as defined in claim 1 wherein the shaft is rotated manually by a crank and handle.

4. The appliance as defined in claim 1 wherein the shaft is rotated manually by a knob or other means.

5. The appliance as defined in claim 1 wherein the shalt is rotated by an electric motor or other power source.

6. The appliance as defined in claim 1 wherein an openable lid is provided that encompasses more than 50% of the top surface area of the bowl.

7. The appliance as defined in claim 6 wherein the openable lid is pivoted with respect to a hinge axis.

8. The appliance as defined in claim 1 wherein the bowl is substantially smaller in area at the bottom than the top, with the sides being curved to provide a cross-sectional area more rapidly increasing at the bottom of the bowl than at the top.

9. The appliance as defined in claim 8 wherein the shape of the bowl comprise a flat bottom, a first radius tangent to the bottom a second radius larger than the first radius that is tangent to both the first radius a cylindrical portion at the top.

10. The appliance as defined in claim 1 wherein the shape of the howl is nonsymmetrical with respect to the circular bottom whereby the area of the bowl increases more in the side opposite that contained by the handle and stirring shaft.

11. The appliance as defined in claim 10 wherein the shape of the bowl is essentially a truncated cone with the bottom truncation configured to be essentially perpendicular to one side of the cone.

\* \* \* \* \*